(12) United States Patent
Heiskanen

(10) Patent No.: US 12,206,807 B2
(45) Date of Patent: Jan. 21, 2025

(54) LOCKING ARRANGEMENT FOR A FOLDABLE ELECTRONIC DEVICE

(71) Applicant: Huawei Technologies Co., Ltd., Shenzhen (CN)

(72) Inventor: Juuso Heiskanen, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 17/770,180

(22) PCT Filed: Oct. 22, 2019

(86) PCT No.: PCT/EP2019/078629
§ 371 (c)(1),
(2) Date: Apr. 19, 2022

(87) PCT Pub. No.: WO2021/078362
PCT Pub. Date: Apr. 29, 2021

(65) Prior Publication Data
US 2022/0303369 A1    Sep. 22, 2022

(51) Int. Cl.
*H04M 1/02* (2006.01)
*G06F 1/16* (2006.01)

(52) U.S. Cl.
CPC ........ *H04M 1/0216* (2013.01); *G06F 1/1679* (2013.01); *G06F 1/1681* (2013.01); *H04M 1/0268* (2013.01)

(58) Field of Classification Search
CPC .. H02K 15/068; H02K 17/165; H02K 17/168; H02K 7/061; H02K 7/116; H02N 11/002; H05K 13/026; H05K 7/20136; H05K 7/20218; H05K 7/20409; H05K 13/021; G08C 17/02; G01N 1/12; G02B 13/20; G02B 17/00; G02F 1/133711; G02F 1/133723; G02F 1/133734; G02F 1/133788; G03B 9/08; G03B 9/22; G03F 7/70066; G03F 7/70358; G03F 7/70558; G07D 11/10; G07D 11/12; G07D 11/14; G09F 11/06; G11B 21/22; G11B 25/043;
(Continued)

(56) References Cited

U.S. PATENT DOCUMENTS 10,209,743 B1    2/2019    Hsu et al.
2005/0006212 A1*  1/2005    Han ................... H04M 1/0216
                                                    200/61.7
(Continued)

FOREIGN PATENT DOCUMENTS

CN    103985315 A    8/2014
WO    03044974 A1    5/2003
WO    2003044974 A1  5/2003

*Primary Examiner* — Ronald Eisner
(74) *Attorney, Agent, or Firm* — Conley Rose, P.C.

(57) ABSTRACT

A hinge assembly for a foldable electronic device comprises a row of interconnected and abutting hinge blades and at least one linear actuator. The linear actuator comprises a rotation shaft and a linear drive arrangement. The first end of the linear drive arrangement is interconnected with the rotation shaft, and the second is connected to one hinge blade. The linear actuator further comprises a locking arrangement for locking the hinge assembly, and the locking arrangement comprising a cam element interlocking with a cam section located on the rotation shaft.

20 Claims, 7 Drawing Sheets

(58) Field of Classification Search
CPC .......... G11B 33/148; G11B 5/54; G21B 1/03;
G21B 1/23; H01B 17/14; H01L 21/027;
H01M 10/06; H01M 10/4207; H01M
10/613; H01M 10/617; H01M 10/635;
H01M 10/6563; H02B 13/025; H02B
13/0352; G06F 1/1615–1681; G06F
2203/04102; H04M 1/0214–0229
See application file for complete search history.

(56) References Cited

U.S. PATENT DOCUMENTS

2014/0226275 A1    8/2014   Ko et al.
2019/0245955 A1    8/2019   Lee

* cited by examiner

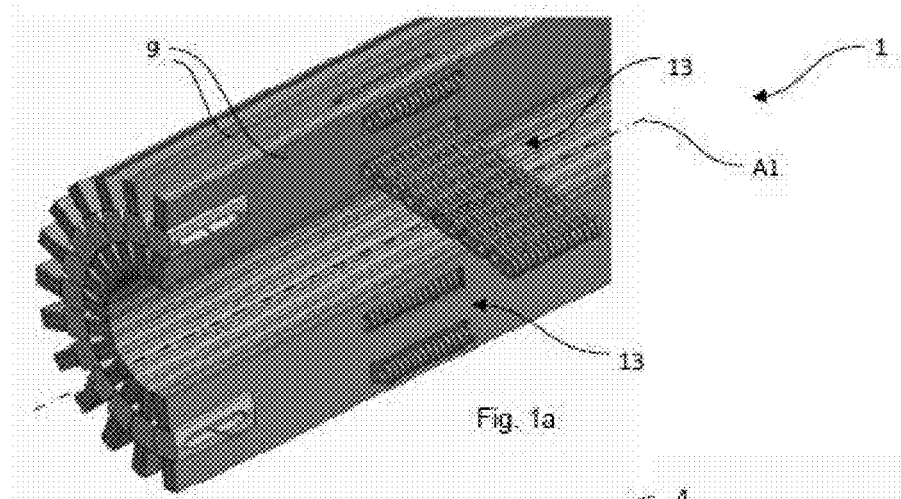
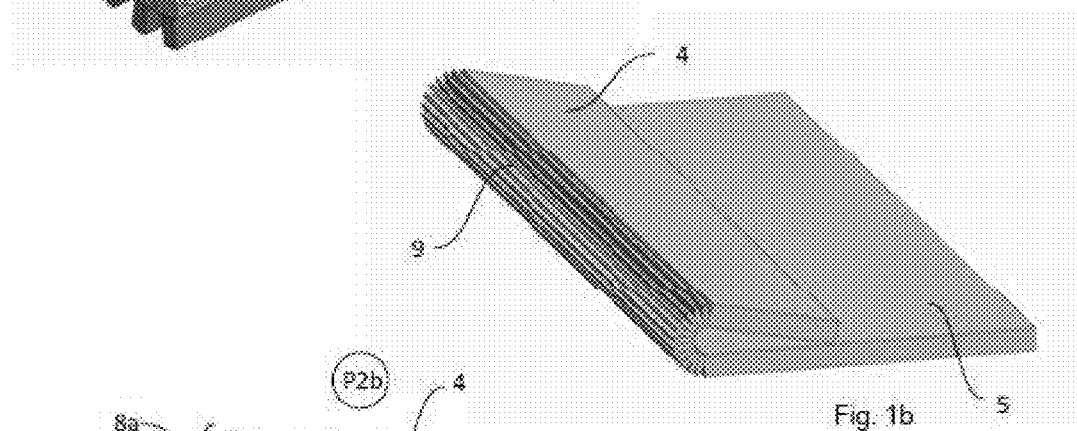
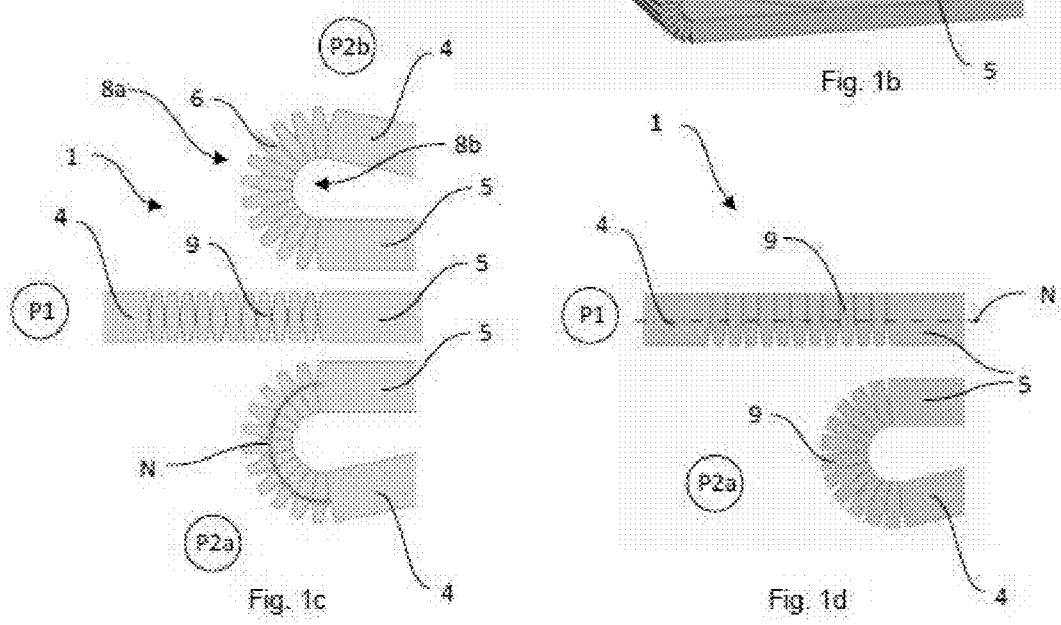

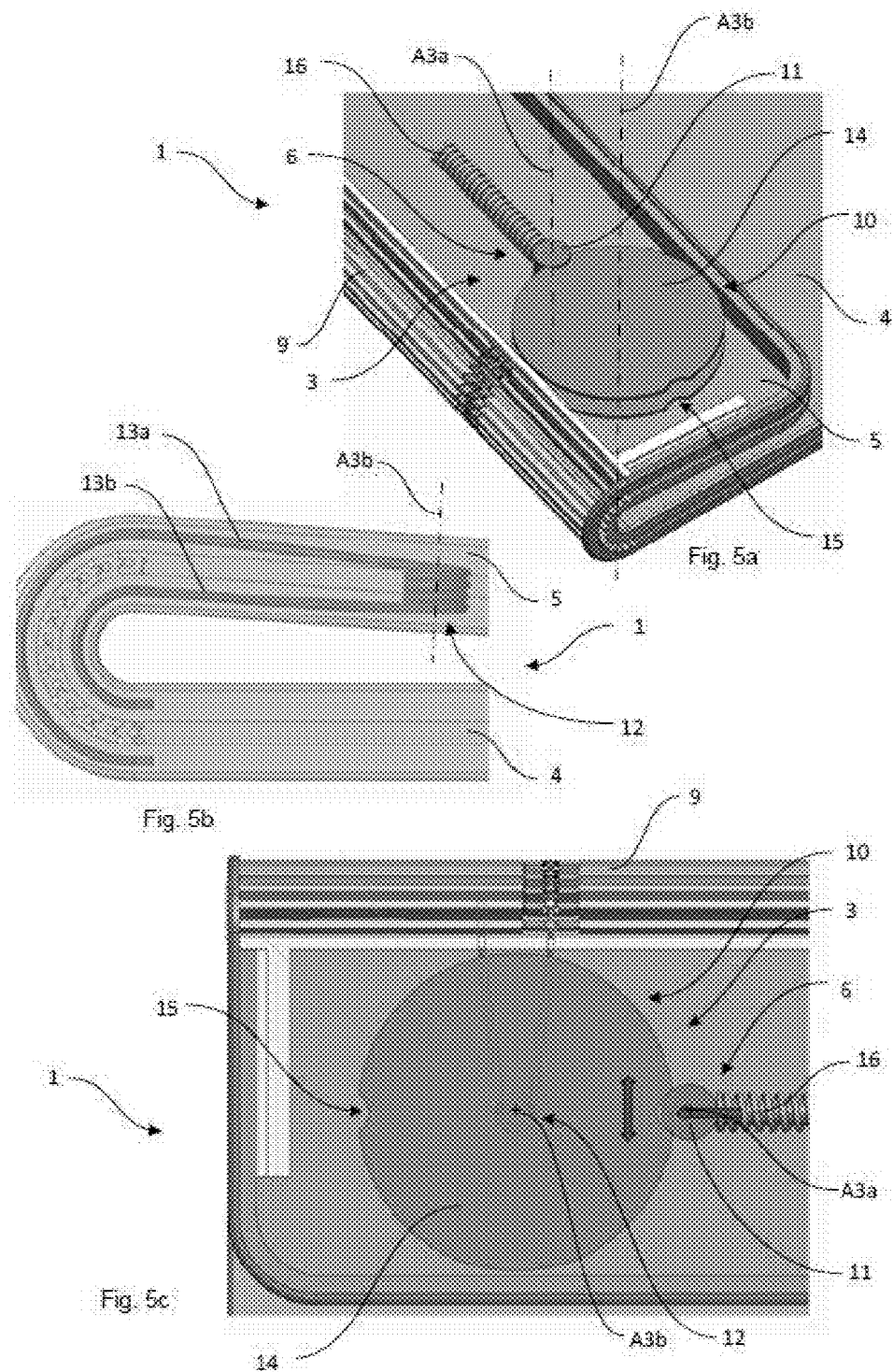

LOCKING ARRANGEMENT FOR A FOLDABLE ELECTRONIC DEVICE

CROSS-REFERENCE TO RELATED APPLICATIONS

This is a U.S. National Stage of International Patent Application No. PCT/EP2019/078629 filed on Oct. 22, 2019, which is hereby incorporated by reference in its entirety.

TECHNICAL FIELD

The disclosure relates to a hinge assembly for an electronic device, the hinge assembly being moveable between an unfolded position and a folded end position.

BACKGROUND

The size of electronic devices, such as tablets and mobile phones, is an important consideration when designing electronic devices. The user oftentimes requests the outer dimensions of the device to be as small as possible while still providing a display which is as large as possible.

This problem may be solved, e.g., by means of a foldable electronic device comprising one or several support bodies, e.g. interconnected by means of hinges, covered by a display. The support body/bodies and the display can be folded together to provide an as small electronic device as possible, and unfolded to provide an as large display as possible.

Preferably, the hinge can be locked in both an unfolded position and a folded position. However, stacking up of manufacturing tolerances for any locking components affects the flatness of the electronic device in the unfolded position, and movement between several pivot points have to be synchronized in order to provide enough locking force.

SUMMARY

It is an object to provide an improved foldable electronic device. The foregoing and other objects are achieved by the features of the independent claim. Further implementation forms are apparent from the dependent claims, the description, and the figures.

According to a first aspect, there is provided a hinge assembly for an electronic device, the hinge assembly being moveable between an unfolded position and a folded end position, the hinge assembly comprising a row of interconnected and abutting hinge blades and at least one linear actuator, the hinge blades being aligned in a common plane when the hinge assembly is in the unfolded position, each hinge blade being rotated relative neighboring hinge blades around a hinge assembly rotation axis when the hinge assembly is moved to the folded end position, the linear actuator comprising a rotation shaft and a linear drive arrangement, a first end of the linear drive arrangement being interconnected with the rotation shaft, a second, opposite end of the linear drive arrangement being connected to at least one hinge blade, an actuator axis extending between the first and second ends and perpendicular to the hinge assembly rotation axis, wherein actuation of the linear actuator along the actuator axis urges each hinge blade to rotate relative neighboring hinge blades around the hinge assembly rotation axis, the linear actuator further comprising a locking arrangement for locking the hinge assembly in at least one of the unfolded position and the folded end position, the locking arrangement comprising a cam element interlocking with a cam section located on the rotation shaft.

This solution allows the sections of the electronic device, which are interconnected by the hinge assembly, to be pivoted easily without effort, while still being securely locked into place in one of the desired positions, i.e. in the unfolded position or a folded end position. Furthermore, by having only one locking arrangement, there is no stacking up of individual manufacturing tolerances, providing better flatness in the unfolded position, while avoiding having to synchronize movement between several pivot points in order to provide enough locking force.

In a possible implementation form of the first aspect, the rotation shaft extends in parallel with the hinge assembly rotation axis and the linear drive arrangement extends along the actuator axis, the cam element enclosing a section of the rotation shaft such that the cam element and the rotation shaft share a center axis, providing a reliable locking arrangement which nevertheless takes up very little space.

In a further possible implementation form of the first aspect, the rotation shaft extends perpendicular to the hinge assembly rotation axis and the actuator axis, the cam element being arranged adjacent one end of the rotation shaft, the cam element comprising a circular element extending in a first plane perpendicular to a center axis of the rotation shaft, a center axis of the cam element extending in parallel with said center axis of the rotation shaft, the cam section comprising a circular section extending in the first plane and comprising at least one peripheral notch adapted for receiving the circular element. This allows the required locking forces on the cam element and the cam section to be significantly reduced while keeping the device locking forces the same. Furthermore, the locking position accuracy is improved.

In a further possible implementation form of the first aspect, the hinge assembly further comprises a resilient element biasing the cam element towards the cam section.

In a further possible implementation form of the first aspect, the resilient element comprises a spring.

In a further possible implementation form of the first aspect, the hinge assembly comprises a neutral axis, a center axis of the rotation shaft intersecting the neutral axis, a first end of the linear drive arrangement engaging the rotation shaft, a second end of the linear drive arrangement engaging a first location and a second location of an individual hinge blade, the first location and the second location being located on opposite sides of, and with equidistant spacing from, the neutral axis. This allows the actuation of the linear actuator to be synchronized along both main surfaces of the electronic device.

In a further possible implementation form of the first aspect, the linear drive arrangement comprises a loop, a first loop section and a second loop section extending on opposite sides of, and with equidistant spacing from, the neutral axis, a first rotation of the rotation shaft rotating the loop in a first direction, and a second rotation of the rotation shaft rotating the loop in a second direction, providing a secure, simple, and reliable linear actuation.

In a further possible implementation form of the first aspect, the linear drive arrangement comprises a chain or a wire.

In a further possible implementation form of the first aspect, the wire is partially wound around the rotation shaft.

In a further possible implementation form of the first aspect, a first dimension of a first outer surface of the hinge assembly is larger than a corresponding second dimension of a second outer surface of the hinge assembly when the hinge assembly is in the folded end position, the linear actuator being actuated by a difference between the first dimension and the second dimension. This allows for a hinge assembly which has as small outer dimensions as possible, while having a sufficient range of motion.

According to a second aspect, there is provided an electronic device comprising a first frame section, a second frame section, a display connected to at least one of the first frame section and the second frame section, and a hinge assembly according to the above interconnecting the first frame section and the second frame section such that the first frame section and the second frame section are pivotable, relative each other, between an unfolded position and a first folded end position, the first frame section and the second frame section being aligned and releasably locked in a common plane when in the unfolded position, the second frame section being superimposed on the first frame section and releasably locked when in the first folded end position.

This allows for a hinge assembly which has as small outer dimensions as possible, while having a range of motion which allows, e.g., the first frame section and the second frame section to be moved between the unfolded position, in which the sections extend to provide a maximum electronic device width, and a folded position in which the two sections are superimposed onto each other such that they extend to provide only a minimum electronic device width.

In a possible implementation form of the second aspect, the hinge assembly interconnects the first frame section and the second frame section such that the first frame section and the second frame section are pivotable, relative each other, between an unfolded position and a second folded end position, the first frame section being superimposed on the second frame section and releasably locked when in the second folded end position.

This and other aspects will be apparent from and the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 1a shows a partial perspective view of a hinge assembly in accordance with one embodiment of the present invention, wherein the hinge assembly is in a folded end position;

FIG. 1b shows a schematic perspective view of a hinge assembly in accordance with one embodiment of the present invention, wherein the hinge assembly is in a folded position;

FIG. 1c shows a schematic side view of a hinge assembly in accordance with one embodiment of the present invention, wherein the hinge assembly is in an unfolded position as well as in both folded end positions;

FIG. 1d shows a schematic side view of a hinge assembly in accordance with a further embodiment of the present invention, wherein the hinge assembly is in an unfolded position and in a folded end position;

FIG. 3b shows a further perspective view of the embodiment of FIG. 2a;

FIG. 5a shows a partial perspective view of a hinge assembly in accordance with a further embodiment of the present invention, wherein the hinge assembly is in a folded end position;

FIG. 5b shows a cross-sectional side view of the embodiment of FIG. 5a;

FIG. 5c shows a top view of the embodiment of FIGS. 5a and 5b;

DETAILED DESCRIPTION

Figure 8:
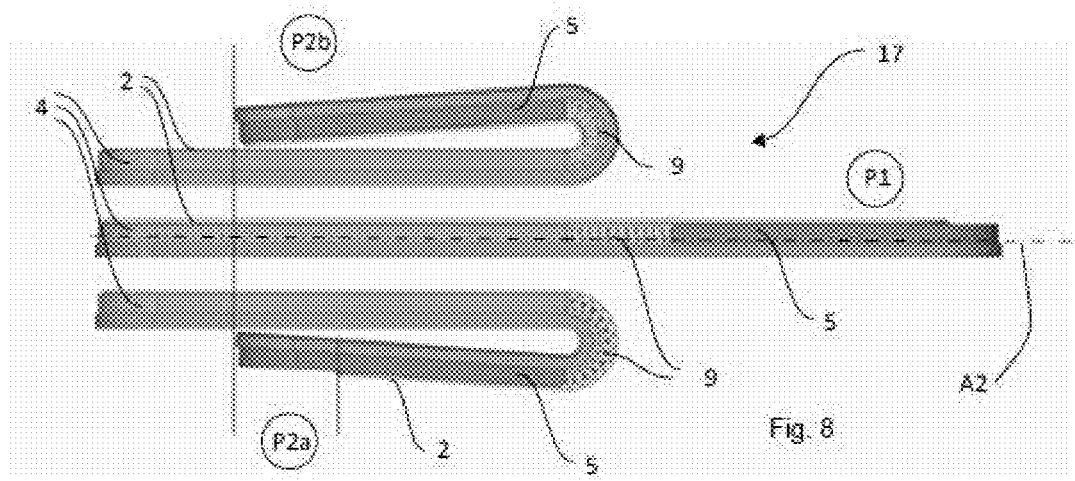
FIG. 8 shows a cross-sectional side view of an electronic device in accordance with one embodiment of the present invention, wherein the electronic device is in an unfolded position as well as in both folded end positions.
Figure 9:
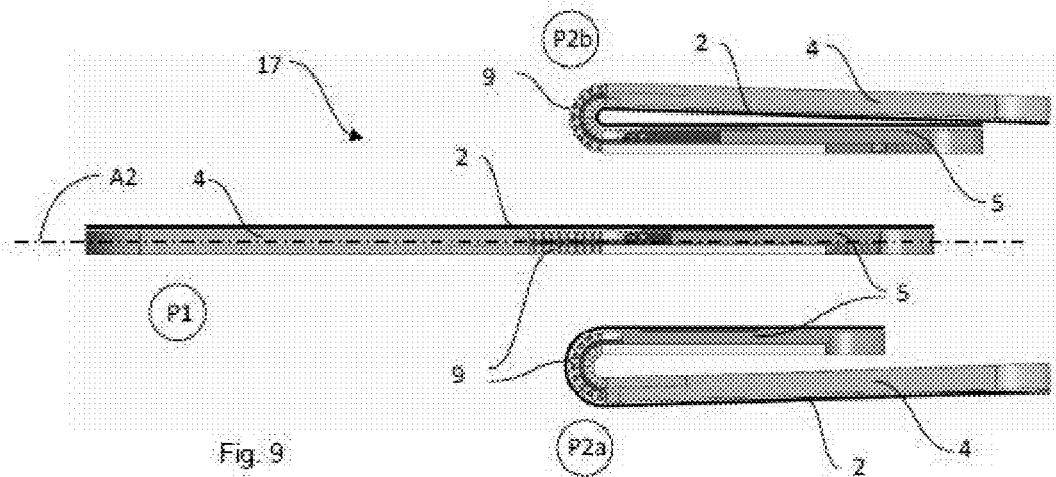
FIG. 9 shows a cross-sectional side view of an electronic device in accordance with one embodiment of the present invention, wherein the electronic device is in an unfolded position as well as in both folded end positions.

FIGS. 8 and 9 show an electronic device 17 comprising a first frame section 4, a second frame section 5, a display 2 connected to at least one of the first frame section 4 and the second frame section 5, and a hinge assembly 1 interconnecting the first frame section 4 and the second frame section 5 such that the first frame section 4 and the second frame section 5 are pivotable, relative each other, between an unfolded position P1 and a first folded end position P2a. In a one embodiment, the hinge assembly 1 is also moveable between the unfolded position P1 and a second folded end position P2b. As the hinge assembly 1 is folded, the electronic device 17 is also folded from an unfolded position to a folded end position. The electronic device 17 may also comprise a back cover arranged oppositely to the display 2.

As shown in FIGS. 1c and 1d, the first frame section 4 and the second frame section 5 are aligned and releasably locked in a common plane when in the unfolded position P1, and the second frame section 5 is superimposed on the first frame section 4 and releasably locked when in the first folded end position P2a. As shown in FIGS. 1b and 1c, the first frame section 4 is superimposed on the second frame section 5 and releasably locked when in the second folded end position P2b.

The hinge assembly 1 comprises a row of interconnected and abutting hinge blades 9, as shown in FIGS. 1a to 1d, and at least one linear actuator 7.

Figure 2A:
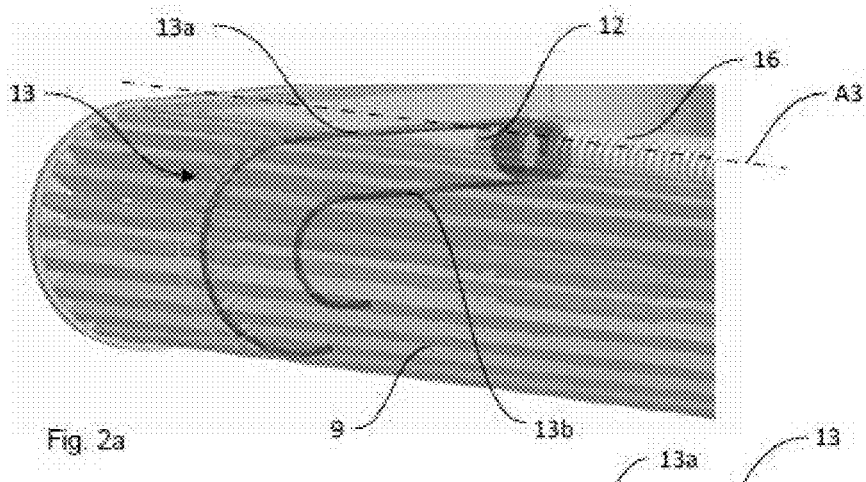
FIG. 2a shows a partial perspective view of a hinge assembly in accordance with one embodiment of the present invention, wherein the hinge assembly is in a folded end position.
Figure 2B:
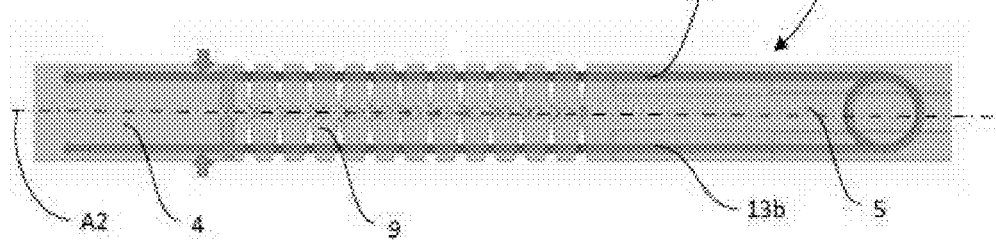
FIG. 2b shows a cross-sectional side view of the embodiment of FIG. 2a, wherein the hinge assembly is in an unfolded end position.

The hinge blades 9 may be tapered and interconnected by means of an elongated connection element extending along an actuator axis A2, as shown in FIG. 2*b*. The hinge blades 9 may be tapered in one direction, as shown in FIG. 1*d*, or in two directions, as shown in FIG. 1*c*. One-directional tapering allows the hinge assembly 1 to fold in only one direction, e.g. to first folded end position P2*a*, while bi-directional tapering allows the hinge assembly 1 to fold in two directions, i.e. to first folded end position P2*a* as well as second folded end position P2*b*.

The hinge blades 9 are aligned in a common plane when the hinge assembly 1 is in the unfolded position P1, as shown in the middle drawings of FIGS. 1*c* and 1*d*. Each hinge blade 9 is rotated relative neighboring hinge blades 9 around a hinge assembly rotation axis A1 when the hinge assembly 1 is moved to one of the folded end positions P2*a*, P2*b*, as shown in the lowermost drawings of FIGS. 1*c* and 1*d*, as well as in the uppermost drawing of FIG. 1*c*.

As shown in FIGS. 2*a* to 5*c*, the linear actuator 7 comprises a rotation shaft 12, extending within the second frame section 5, and at least one linear drive arrangement 13. The first end of the linear drive arrangement 13 is interconnected with the rotation shaft 12, and the second, opposite end of the linear drive arrangement 13 is connected to at least one hinge blade 9 or to the first frame section 4. The actuator axis A2 extends between the first end and the second end, and perpendicular to the hinge assembly rotation axis A1. Actuation of the linear actuator 7 along the actuator axis A2 urges each hinge blade 9 to rotate relative neighboring hinge blades 9 around the hinge assembly rotation axis A1.

A first dimension of a first outer surface 8*a* of the hinge assembly 1 may be larger than a corresponding second dimension of a second outer surface 8*b* of the hinge assembly 1 when the hinge assembly 1 is in the first folded end position P2*a*, as shown in FIG. 1*c*. The linear actuator 7 is actuated by a difference between the first dimension and the second dimension.

The linear actuator 7 further comprises a locking arrangement 3 for locking the hinge assembly 1 in at least one of the unfolded position P1 and the folded end positions P2*a*, P2*b*. The locking arrangement 3 comprises a cam element 6 interlocking with a cam section 10 located on the rotation shaft 12.

As shown in FIGS. 2*a* to 3*b*, the rotation shaft 12 may extend in parallel with the hinge assembly rotation axis A1 while the linear drive arrangement 13 extends along the actuator axis A2. The cam element 6 may be arranged on the rotation shaft 12, enclosing a section thereof, such that the cam element 6 and the rotation shaft 12 share a center axis A3. The cam element 6 is at least partially stationary such that it does not rotate around the shared center axis A3, such that the cam section 10 of the rotation shaft 12 interlocks with different parts of the cam element 6 as the rotation shaft 12 is rotated. For example, if the cam element 6 has two locking positions, i.e. at each 180-degree rotation, then the hinge assembly 1 as well has locking positions at each 180-degree rotation, e.g. when in the first folded end position P2*a* wherein the electronic device may be closed, then in the unfolded position wherein the electronic device may be in tablet mode, and after a further 180-degree rotation when in the second folded end position P2*b*, wherein the electronic device may be in phone mode.

The cam element 6 may be moveable in opposite directions along the shared center axis A3, such that the cam element 6 may oscillate along the shared center axis A3 in response to rotation of rotation shaft 12 and cam section 10.

The hinge assembly 1 may in this case comprise a resilient element 16, such as a spring, sharing the same center axis A3 as the rotation shaft 12 and the cam element 6. The resilient element 16 is arranged such that it biases the cam element 6 towards the cam section 10, keeping the interlock between the cam section 10 and the cam element 6 for at least as long as there is no actuation of the linear actuator 7.

In a further embodiment, shown in FIGS. 5*a* to 5*c*, the rotation shaft 12 extends perpendicular to the hinge assembly rotation axis A1 and the actuator axis A2, with a center axis A3*b*. The cam element 6 is arranged adjacent one side or end of the rotation shaft 12.

The cam element 6 comprises a circular element 11 which may be plate shaped, and extend in a first plane perpendicular to the center axis of the rotation shaft 12. The center axis A3*a* of the cam element 6 extends in parallel with the center axis A3*b* of the rotation shaft 12.

The cam section 10, arranged on the rotation shaft 12, may comprise a circular section 14 extending in the first plane, e.g. in the form of a circular plate or two parallel circular plates, and having an outer diameter which is significantly larger that the diameter of the rotation shaft 12, allowing the required locking forces on the cam element 6 and the cam section 10 to be significantly reduced while keeping the device locking forces the same. The circular section 14 comprises at least one peripheral notch 15 adapted for receiving the circular element 11.

The circular element 11 may be moveable in opposite directions in the first plane, such that the circular element 11 may oscillate in response to rotation of rotation shaft 12 and cam section 10 around center axis A3*b*, as indicated by means of arrows in FIG. 5*c*. The hinge assembly 1 may comprise a resilient element 16, such as a spring, extending within or in parallel with the first plane. The resilient element 16 is arranged such that it biases the circular element 11 towards the cam section 10, keeping the interlock between the cam section 10 and the circular element 11 for at least as long as there is no actuation of the linear actuator 7.

The hinge assembly 1 comprises a neutral axis N, and the center axis of the rotation shaft 12 may intersect the neutral axis N. The first end of the linear drive arrangement 13 engages the rotation shaft 12, extending within e.g. the second frame section 5 and the second end of the linear drive arrangement 13 engages a first location and a second location of an individual hinge blade 9. The second end of the linear drive arrangement 13 may also engage the first frame section 4. The first location and the second location are located on opposite sides of, and with equidistant spacing from, the neutral axis N, as is clear from FIG. 5*b*. The above-mentioned elongated connection element, connecting the hinge blades 9, may extend along the neutral axis N.

In the embodiment shown in FIGS. 2*a* to 3*b*, the center axis A3 of the rotation shaft 12 extends within e.g. the second frame section 5 in the same plane as the neutral axis N. In the embodiment shown in FIGS. 5*a* to 5*c*, the center axis A3*b* of the rotation shaft 12 extends within e.g. the second frame section 5 perpendicular to the neutral axis N, however, the longitudinal extent of the rotation shaft 12 along its center axis A3*b* is limited to extending between the display and the optional back cover of the electronic device.

The linear drive arrangement 13 may comprises a loop, a first loop section 13*a* and a second loop section 13*b* extending on opposite sides of, and with equidistant spacing from, the neutral axis N. The loop may be open at the second end of the linear drive arrangement 13, as shown in FIGS. 2*a*, 2*b*, and 5*b*. A first rotation of the rotation shaft 12, in a first direction around the center axis A3, A3b of the rotation shaft 12, rotates the loop in the first direction, and a second rotation of the rotation shaft 12, in a second direction around the center axis A3, A3b of the rotation shaft 12, rotates the loop in the second direction.

Figure 6:
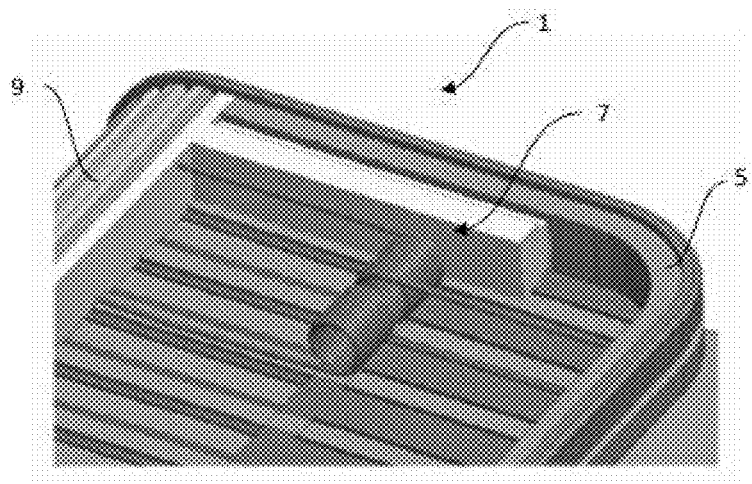
FIG. 6 shows a perspective view of a hinge assembly embodiment in accordance with one embodiment of the present invention, wherein the hinge assembly is in a folded end position.
Figure 7:
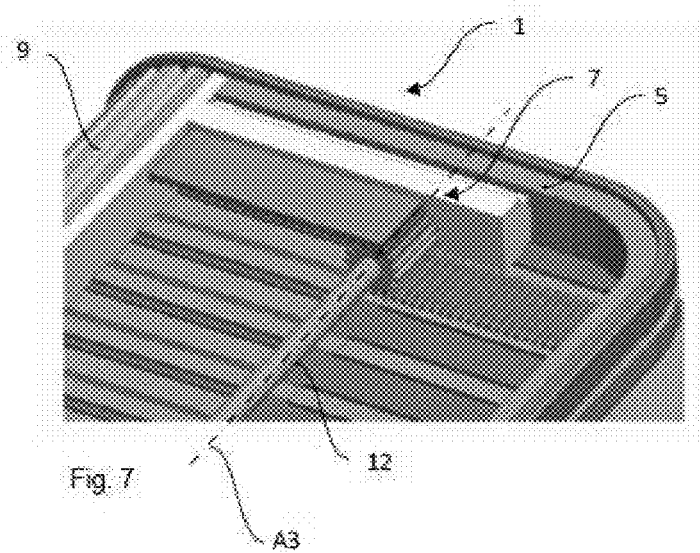
FIG. 7 shows a perspective view of a hinge assembly embodiment in accordance with a further embodiment of the present invention, wherein the hinge assembly is in a folded end position.

The linear drive arrangement 13 may comprises a chain, as indicated in FIG. 7, or a wire, as indicated in FIG. 6.

Figure 2C:
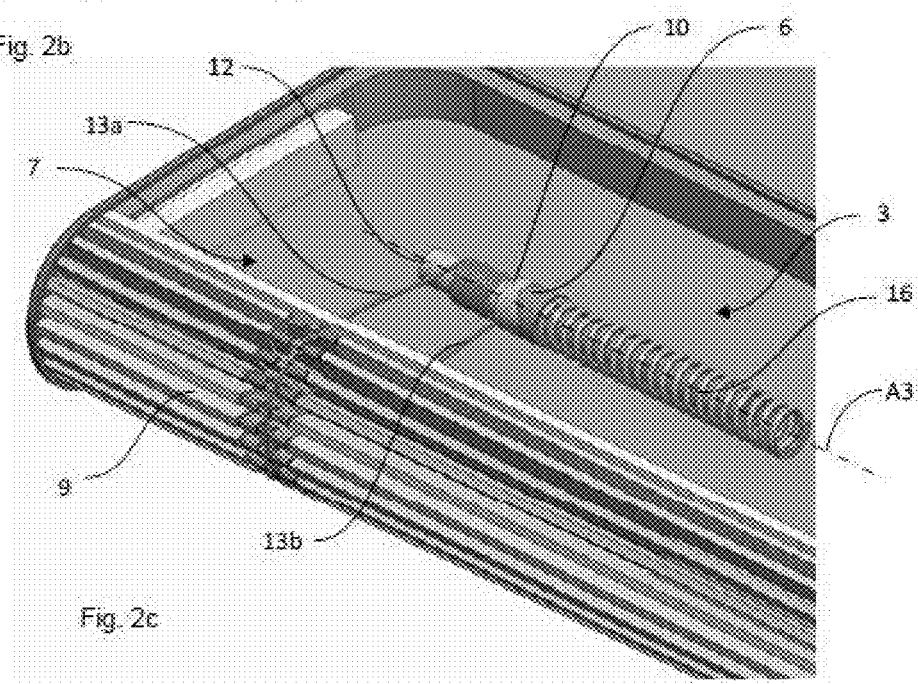
FIG. 2c shows a perspective view of the embodiment of FIGS. 2a and 2b, wherein the hinge assembly is in a folded end position.
Figure 3A:
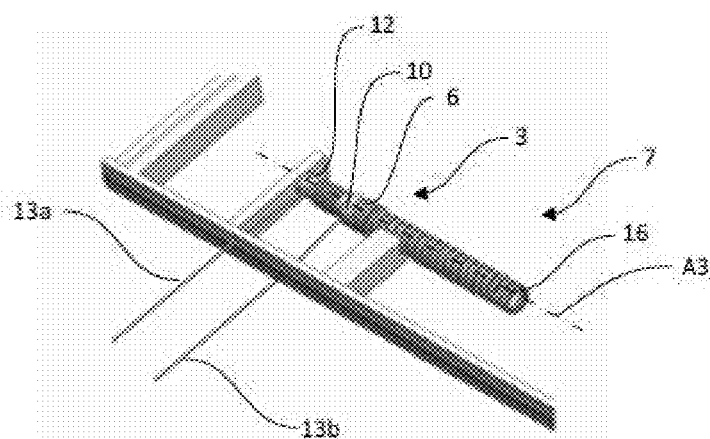
FIG. 3a shows a partial perspective view of a linear actuator of a hinge assembly in accordance with one embodiment of the present invention.
Figure 3B:
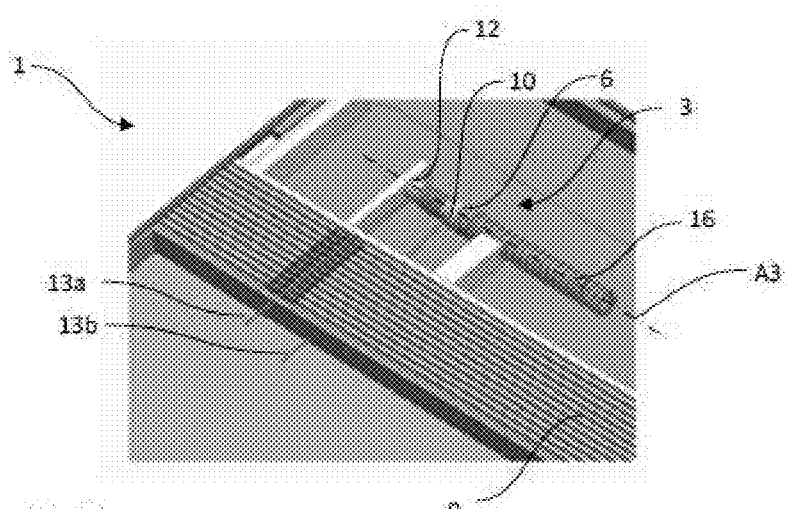
Figure 4A:
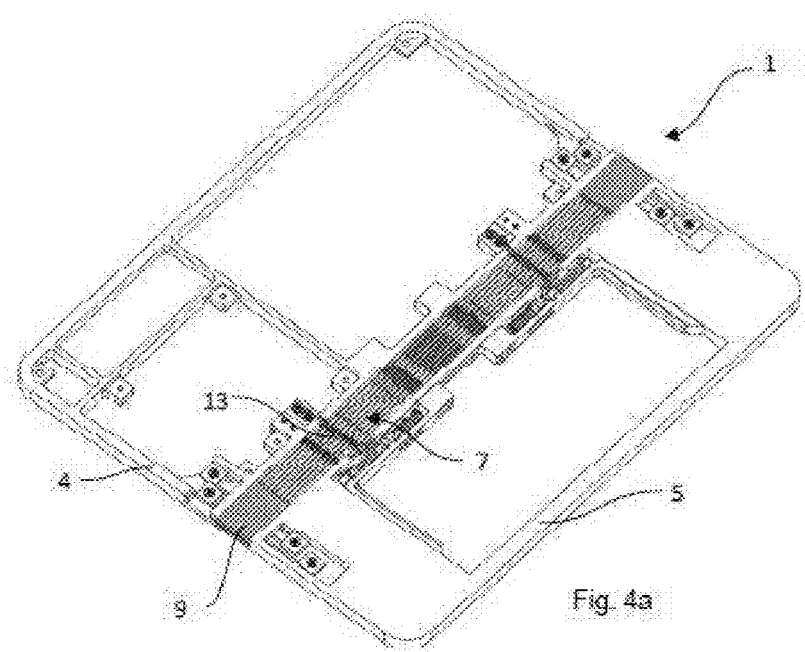
FIG. 4a shows a perspective view of a hinge assembly in accordance with an embodiment of the present invention, wherein the hinge assembly is in an unfolded position.
Figure 4B:
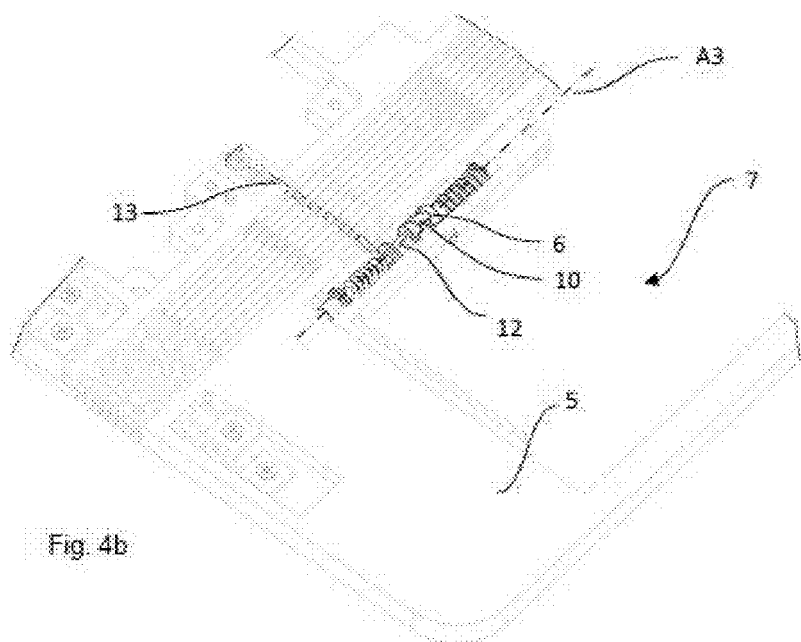
FIG. 4b shows a perspective view of the embodiment of FIG. 4b, wherein the linear actuator is highlighted.

When the linear drive arrangement 13 comprises a wire it may be partially wound around the rotation shaft 12, as shown in FIG. 2c, and extend through the hinge blades 9 along the actuator axis A2 and on opposite sides of, with equidistant spacing from, the neutral axis N.

The linear drive arrangement 13 may comprise two separate chain sections 13a, 13b extending in parallel with equidistant spacing from the neutral axis N and on opposite sides of the elongated connection element as suggested in FIG. 2b. The chain sections extend through the hinge blades 9 along the actuator axis A2, when the hinge assembly 1 is in the unfolded position P1.

The rotation shaft 12 may comprise at least one pinion and chain of the linear drive arrangement 13 may be connected to a first rack engaging the pinion at a first location, as shown in FIG. 7. A first rotation of the rotation shaft 12 and the pinion moves the rack in a first direction along the actuator axis A2, hence pulling the chain in the first direction, and an opposite, second rotation of the rotation shaft 12 and the pinion moves the rack in a second direction along the actuator axis A2, hence pushing the chain in the second direction. The chain, or a second chain section, may be connected to a second rack engaging the pinion at a second location opposite the first location and extending along the actuator axis A2. The first rack and the second rack extend on opposite sides of, and with equidistant spacing from, the neutral axis N. A first rotation of the rotation shaft 12 and the pinion simultaneously moves the first rack in the first direction and the second rack in the second direction, such that the first rack pulls the chain in the first direction and the second rack, simultaneously, pushes the chain in the second direction. An opposite, second rotation of the rotation shaft 12 and the pinion simultaneously moves the first rack in the second direction and the second rack in the first direction, such that the first rack pushes the chain in the second direction and the second rack, simultaneously, pulls the chain in the first direction.

As previously mentioned, the present disclosure also relates to an electronic device 17 comprising the above described hinge assembly 1. The display 2 and/or the back cover of the electronic device may be fixedly connected to the first frame section 4, and pivoting the first frame section 4 or the second frame section 5 will actuate the linear actuator 7. The linear actuator 7 urges the display 2 and/or the back cover to slide in relation to the hinge assembly 1 such that an overlap between the display 2 and/or the back cover and the second frame section 5 varies. The overlap between the display 2 and the second frame section 5 is at a minimum when the foldable assembly 1 is in the first folded end position P2a. Correspondingly, the overlap is at a maximum when the hinge assembly 1 is in the second folded end position P2b, as shown in, e.g., FIG. 8.

In a further embodiment, the display 2 or the back cover 2b may be fixedly connected to the first frame section 4 and the second frame section 5. The linear actuator 7 urges the second frame section 5 to slide, e.g. on sliding rails, in relation to the hinge assembly 1 such that the distance between the hinge assembly 1 and the second frame section 5 varies, as shown in FIG. 9. The distance between the hinge assembly 1 and the second frame section 5 is at a minimum when the foldable assembly 1 is in the first folded end position P2a, and the distance between the hinge assembly 1 and the second frame section 5 is at a maximum when the foldable assembly 1 is in the second folded end position P2b.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. A hinge assembly for an electronic device, wherein the hinge assembly is moveable between an unfolded position and a folded end position, and wherein the hinge assembly comprises:
   a row of interconnected and abutting hinge blades aligned in a common plane when the hinge assembly is in the unfolded position, wherein each of the hinge blades is rotated relative to neighboring hinge blades around a hinge assembly rotation axis when the hinge assembly is moved to the folded end position; and
   a linear actuator comprising:
   a rotation shaft comprising a cam section;
   a linear drive arrangement, comprising:
   a first end interconnected with the rotation shaft; and
   a second end opposite to the first end and coupled to at least one of the hinge blades, wherein actuation of the linear actuator along an actuator axis extending between the first end and the second end and perpendicular to the hinge assembly rotation axis urges each of the hinge blades to rotate relative neighboring hinge blades around the hinge assembly rotation axis; and
   a locking arrangement for locking the hinge assembly in at least one of the unfolded position or the folded end position,
   wherein the locking arrangement comprises a cam element interlocking with a cam section located on the rotation shaft.

2. The hinge assembly of claim 1, wherein the rotation shaft extends in parallel with the hinge assembly rotation axis, wherein the linear drive arrangement extends along the actuator axis, and wherein the cam element is configured to enclose a section of the rotation shaft and share a center axis with the rotation shaft.

3. The hinge assembly of claim 1, wherein the rotation shaft extends perpendicular to the hinge assembly rotation axis and the actuator axis, wherein the cam element is disposed adjacent to a third end of the rotation shaft, wherein the cam element comprises a circular element extending in a first plane perpendicular to a first center axis of the rotation shaft, wherein a second center axis of the circular element extends in parallel with the first center axis, and wherein the cam section comprises: a circular section extending in the first plane; and at least one peripheral notch configured to receive the circular element.

4. The hinge assembly of claim 1, further comprising a resilient element configured to bias the cam element towards the cam section.

5. The hinge assembly of claim 4, wherein the resilient element comprises a spring.

6. The hinge assembly of claim 1, wherein a center axis of the rotation shaft intersects a neutral axis, wherein the first end engages the rotation shaft, wherein the second end engages a first location of an individual hinge blade and a second location of the individual hinge blade, and wherein the first location and the second location are located on opposite sides of, and with equidistant spacing from, the neutral axis.

7. The hinge assembly of claim 6, wherein the linear drive arrangement further comprises: a loop; a first loop section; and a second loop section, wherein the first loop section and the second loop section extend on opposite sides of, and with equidistant spacing from, the neutral axis, wherein a first rotation of the rotation shaft is configured to rotate the loop in a first direction, and wherein a second rotation of the rotation shaft is configured to rotate the loop in a second direction.

8. The hinge assembly of claim 1, wherein the linear drive arrangement further comprises a chain a wire.

9. The hinge assembly of claim 8, wherein the wire is partially wound around the rotation shaft.

10. The hinge assembly of claim 1, further comprising: a first outer surface comprising a first dimension; and a second outer surface comprising a second dimension corresponding to the first dimension, wherein the first dimension is larger than the second dimension when the hinge assembly is in the folded end position, and wherein the linear actuator is configured to actuate by a difference between the first dimension and the second dimension.

11. An electronic device comprising:
a first frame section;
a second frame section;
a display coupled to at least one of the first frame section or the second frame section; and
a hinge assembly interconnecting the first frame section and the second frame section to enable the first frame section and the second frame section to be pivotable, relative to each other, between an unfolded position and a folded end position, wherein the first frame section and the second frame section are aligned and releasably locked in a common plane when in the unfolded position, wherein the second frame section is superimposed on the first frame section and releasably locked when in the folded end position, and wherein the hinge assembly comprises:
a row of interconnected and abutting hinge blades aligned in a common plane when the hinge assembly is in the unfolded position, wherein each of the hinge blades is rotated relative to neighboring hinge blades around a hinge assembly rotation axis when the hinge assembly is moved to the folded end position; and
a linear actuator comprising:
a rotation shaft;
a linear drive arrangement comprising:
a first end interconnected with the rotation shaft; and
a second end opposite to the first end and coupled to at least one of the hinge blades, wherein actuation of the linear actuator along an actuator axis that is extending between the first end and the second end and perpendicular to the hinge assembly rotation axis urges each of the hinge blades to rotate relative neighboring hinge blades around the hinge assembly rotation axis; and
a locking arrangement for locking the hinge assembly in at least one of the unfolded position or the folded end position and comprising a cam element interlocking with a cam section located on the rotation shaft.

12. The electronic device of claim 11, wherein the rotation shaft extends in parallel with the hinge assembly rotation axis, wherein the linear drive arrangement extends along the actuator axis, and wherein the cam element is configured to enclose a section of the rotation shaft and share a center axis with the rotation shaft.

13. The electronic device of claim 11, wherein the rotation shaft extends perpendicular to the hinge assembly rotation axis and the actuator axis, wherein the cam element is disposed adjacent to a third end of the rotation shaft, wherein the cam element comprises a circular element extending in a first plane perpendicular to a first center axis of the rotation shaft, wherein a second center axis of the circular element extends in parallel with the first center axis, and wherein the cam section comprises: a circular section extending in the first plane; and at least one peripheral notch configured to receive the circular element.

14. The electronic device of claim 11, further comprising a resilient element configured to bias the cam element towards the cam section.

15. The electronic device of claim 14, wherein the resilient element comprises a spring.

16. The electronic device of claim 11, wherein a center axis of the rotation shaft intersects a neutral axis, wherein the first end engages the rotation shaft, wherein the second end engages a first location of an individual hinge blade and a second location of the individual hinge blade, and wherein the first location and the second location are located on opposite sides of, and with equidistant spacing from, the neutral axis.

17. The electronic device of claim 16, wherein the linear drive arrangement further comprises: a loop; a first loop section; and a second loop section, wherein the first loop section and the second loop section extend on opposite sides of, and with equidistant spacing from, the neutral axis, wherein a first rotation of the rotation shaft is configured to rotate the loop in a first direction, and wherein a second rotation of the rotation shaft is configured to rotate the loop in a second direction.

18. The electronic device of claim 11, wherein the linear drive arrangement further comprises a wire.

19. The electronic device of claim 18, wherein the wire is partially wound around the rotation shaft.

20. The hinge assembly of claim 1, wherein the linear drive arrangement further comprises a chain.

* * * * *